United States Patent
Chen

(10) Patent No.: US 9,313,755 B2
(45) Date of Patent: Apr. 12, 2016

(54) METHOD, DEVICE, AND SYSTEM FOR SYNCHRONIZING PHYSICAL LAYER STATE

(71) Applicant: Huawei Technologies Co., Ltd.

(72) Inventor: Jun Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 205 days.

(21) Appl. No.: 14/064,998

(22) Filed: Oct. 28, 2013

(65) Prior Publication Data

US 2014/0056287 A1  Feb. 27, 2014

Related U.S. Application Data

(63) Continuation of application No. PCT/CN2012/071696, filed on Feb. 28, 2012.

(30) Foreign Application Priority Data

Apr. 28, 2011 (CN) .......................... 2011 1 0108663

(51) Int. Cl.
*H04W 56/00* (2009.01)
*H04B 7/26* (2006.01)
*H04W 76/04* (2009.01)

(52) U.S. Cl.
CPC ............. *H04W 56/00* (2013.01); *H04B 7/2603* (2013.01); *H04W 76/046* (2013.01)

(58) Field of Classification Search
None
See application file for complete search history.

(56) References Cited

U.S. PATENT DOCUMENTS

| | | | |
|---|---|---|---|
| 2003/0153323 A1* | 8/2003 | Hwang | 455/450 |
| 2003/0185159 A1 | 10/2003 | Seo et al. | |
| 2004/0009767 A1* | 1/2004 | Lee et al. | 455/422.1 |
| 2006/0185159 A1 | 8/2006 | Correll et al. | |
| 2008/0182594 A1* | 7/2008 | Flore et al. | 455/458 |
| 2008/0198763 A1* | 8/2008 | Fischer et al. | 370/254 |
| 2010/0034171 A1 | 2/2010 | Pelletier et al. | |
| 2010/0202432 A1* | 8/2010 | Dai | 370/342 |
| 2011/0081928 A1* | 4/2011 | Chen et al. | 455/507 |

(Continued)

FOREIGN PATENT DOCUMENTS

| | | |
|---|---|---|
| CN | 1964555 A | 5/2007 |
| CN | 1996819 A | 7/2007 |

(Continued)

OTHER PUBLICATIONS

3rd Generation Partnership Project; Technical Specification Group Radio Access Network; Radio Resource Control (RRC); Protocol specification (Release 10), 3GPP TS 25.331 V10.3.1, Apr. 2011, 50 pages.

(Continued)

*Primary Examiner* — Anh-Vu Ly
*Assistant Examiner* — Hector Reyes
(74) *Attorney, Agent, or Firm* — Slater & Matsil, L.L.P.

(57) ABSTRACT

The present invention discloses a method, a device, and a system for synchronizing a physical layer state, and belongs to the field of communications technologies. The present invention realizes synchronization of the physical layer state of the first feature at the network side and the terminal after the terminal updates the RRC layer configuration corresponding to the first feature.

15 Claims, 7 Drawing Sheets

(56) References Cited

U.S. PATENT DOCUMENTS

| | | | |
|---|---|---|---|
| 2011/0287774 A1* | 11/2011 | Li | 455/452.1 |
| 2011/0299485 A1* | 12/2011 | Hannu et al. | 370/329 |
| 2013/0188543 A1* | 7/2013 | Dwyer et al. | 370/311 |

FOREIGN PATENT DOCUMENTS

| | | |
|---|---|---|
| CN | 101860905 A | 10/2010 |
| CN | 102036284 A | 4/2011 |
| JP | 2008541544 A | 11/2008 |
| JP | 2010521836 A | 6/2010 |
| JP | 2012514428 A | 6/2012 |
| WO | 2004028050 A1 | 4/2004 |
| WO | 2006118426 A1 | 11/2006 |
| WO | 2008098352 A1 | 8/2008 |
| WO | 2008115006 A1 | 9/2008 |
| WO | 2009022812 A2 | 2/2009 |
| WO | 2009100220 A2 | 8/2009 |
| WO | 2010078208 A1 | 7/2010 |

OTHER PUBLICATIONS

3rd Generation Partnership Project; Technical Specification Group Radio Access Network; UTRAN Iub interface Node B Application Part (NBAP) signalling (Release 10), 3GPP TS 25.433 V10.2.0, Mar. 2011, 1290 pages.

Chinese Office Action received in Application No. 201110108663.1 mailed Oct. 31, 2013, 6 pages.

Extended European Search Report received in Application No. 12776222.7-1855 mailed Nov. 19, 2013, 8 pages.

International Search Report and Written Opinion received in Application No. PCT/CN2012/071696 mailed Jun. 7, 2012, 11 pages.

* cited by examiner

METHOD, DEVICE, AND SYSTEM FOR SYNCHRONIZING PHYSICAL LAYER STATE This application is a continuation of International Application No. PCT/CN2012/071696, filed on Feb. 28, 2012, which claims priority to Chinese Patent Application No. 201110108663.1, filed on Apr. 28, 2011, both of which are hereby incorporated herein by reference in their entireties.

TECHNICAL FIELD

The present invention relates to the field of communications technologies, and in particular, to a method, a device, and a system for synchronizing a physical layer state.

BACKGROUND

A DTX/DRX (discontinuous transmission/discontinuous reception) feature is introduced in the UMTS (universal mobile telecommunications system) R7 (release 7). This feature allows a terminal to discontinuously transmit/receive data at the uplink and downlink, thereby saving electricity for the terminal and increasing the capacity at the network side. When the terminal is connected to a network, an RNC (radio network controller) admits access of the terminal, completes configuration with a NodeB (node base station) according to the DTX/DRX capability reported by the terminal, and completes configuration with the terminal, so that the terminal may perform discontinuous transmission at the uplink or discontinuous reception at the downlink; the NodeB may perform discontinuous transmission at the downlink or discontinuous reception at the uplink. After the terminal is connected to the network, the RNC may further initiate DTX/DRX re-configuration as required to maintain a DTX/DRX enabled or disabled state at the RRC (radio resource control) layer with the terminal; the NodeB may further activate or deactivate a DTX/DRX state at the physical layer for the terminal through an HS-SCCH (high speed shared control channel) order, thereby maintaining the DTX/DRX activated or deactivated state at the physical layer with the terminal.

An HS-SCCH less feature is further introduced in the UMTS R7. For first-time transmission of HSDPA (high speed downlink packet access) data, no indication is made on the HS-SCCH channel, but the data is acquired through blind detection by the terminal for the HS-PDSCH (high speed physical downlink shared control channel). If the detection succeeds, an acknowledgment response is sent to the NodeB, in which case the NodeB sends a data block to the terminal; if the detection fails, no response is sent to the NodeB, in which case the NodeB will re-transmit the previous data block, and make an indication on the HS-SCCH channel, thereby saving overhead of the HS-SCCH resources. The NodeB may also activate or deactivate an HS-SCCH less state at the physical layer for the terminal through the HS-SCCH order, thereby maintaining the HS-SCCH less activated or deactivated state at the physical layer with the terminal.

A DC-HSDPA (dual cell-HSDPA) feature is introduced in the UMTS R8, which allows a terminal to receive HSDPA data at the same time in two cells with different frequencies and same coverage and thereby obtain a high downlink data transmission rate. A DC-HSUPA (dual cell-high speed uplink packet access) feature is further introduced in the UMTS R9, which allows a terminal to send HSUPA data at the same time in two cells with different frequencies and same coverage and thereby obtain a high uplink data transmission rate. The NodeB may also activate or deactivate a DC-HSDPA state or DC-HSUPA state at the physical layer for the terminal through the HS-SCCH order, thereby maintaining the DC-HSDPA or DC-HSUPA activated or deactivated state at the physical layer with the terminal.

In the prior art, when the RNC re-configures the DTX/DRX feature, HS-SCCH less feature, DC-HSDPA feature, and DC-HSUPA feature, it will maintain the enabled state of each of the features at the RRC layer with the terminal; however, after re-configuration by the RNC, no definite solution is provided for the state of each of the features at the physical layer of the terminal. Therefore, different processing may be used at different terminals, thereby resulting in a problem where the physical layer state of a feature at the terminal may be inconsistent with that at the network side. For example, after the RNC re-configures the DTX/DRX feature, the DTX/DRX state at the physical layer of some terminals is an activated state by default, whereas some terminals maintain the previous DTX/DRX state at the physical layer by default. If the default DTX/DRX state at the physical layer of a terminal happens to be opposite to the DTX/DRX state at the physical layer maintained by the NodeB, data loss may occur during transmission, or even the terminal may suffer call drops.

SUMMARY OF THE INVENTION

To solve the problem where the physical layer state of a feature at the terminal is different from that at the network side, embodiments of the present invention provide a method, a device, and a system for synchronizing a physical layer state of a feature.

An aspect of the present invention provides a method for synchronizing a physical layer state, including: receiving relevant information about a first feature reported by a terminal; according to the relevant information about the first feature, judging whether the terminal is a terminal that has a specified state at a physical layer after configuration at a radio resource control (RRC) layer corresponding to the first feature is updated; and notifying a base station to control, according to whether the terminal has the specified state at the physical layer after the configuration at the RRC layer corresponding to the first feature is updated, a physical layer state of the first feature after re-configuration; or, according to whether the terminal has the specified state at the physical layer after the configuration at the RRC layer corresponding to the first feature is updated, notifying the base station of whether to control a physical layer state of the first feature.

Another aspect of the present invention provides a method for synchronizing a physical layer state, including: receiving a notification from a serving radio network controller (SRNC) where the notification is used to indicate whether a terminal has a specified state at a physical layer after configuration at a radio resource control (RRC) layer corresponding to a first feature is updated, or indicate whether a base station controls a physical layer state of the first feature; and according to the notification, controlling the physical layer state of the first feature after the re-configuration, or, according to the notification, deciding to control or not control the physical layer state of the first feature.

Another aspect of the present invention provides an SRNC, including: a receiving module, configured to receive relevant information about a first feature reported by a terminal; a judging module, configured to: according to the relevant information about the first feature, judge whether the terminal is a terminal that has a specified state at a physical layer after configuration at a radio resource control (RRC) layer corresponding to the first feature is updated; and a notifying module, configured to notify a base station to control, according to whether the terminal has the specified state at the physical layer after the configuration at the RRC layer corresponding to the first feature is updated, a physical layer state of the first feature after re-configuration; or, according to whether the terminal has the specified state at the physical layer after the configuration at the RRC layer corresponding to the first feature is updated, notify the base station of whether to control a physical layer state of the first feature.

Another aspect of the present invention provides a base station, including: a receiving module, configured to receive a notification from a serving radio network controller (SRNC) where the notification is used to indicate whether a terminal has a specified state at a physical layer after configuration at a radio resource control (RRC) layer corresponding to a first feature is updated, or indicate whether the base station controls a physical layer state of the first feature; and a processing module, configured to: according to the notification, control the physical layer state of the first feature after the re-configuration, or, according to the notification, decide to control or not control the physical layer state of the first feature.

Another aspect of the present invention provides a system for synchronizing a physical layer state, including the SRNC and the base station.

The technical solutions provided in embodiments of the present invention enable the network side, after the terminal updates the configuration at the RRC layer corresponding to the first feature, to synchronize with the physical layer state of the first feature of the terminal, solving the problem where the physical layer state of a feature at the terminal may be different from that at the network side, and thereby avoiding loss during data transmission and preventing call drops of the terminal.

DETAILED DESCRIPTION OF ILLUSTRATIVE EMBODIMENTS

Figure 1:
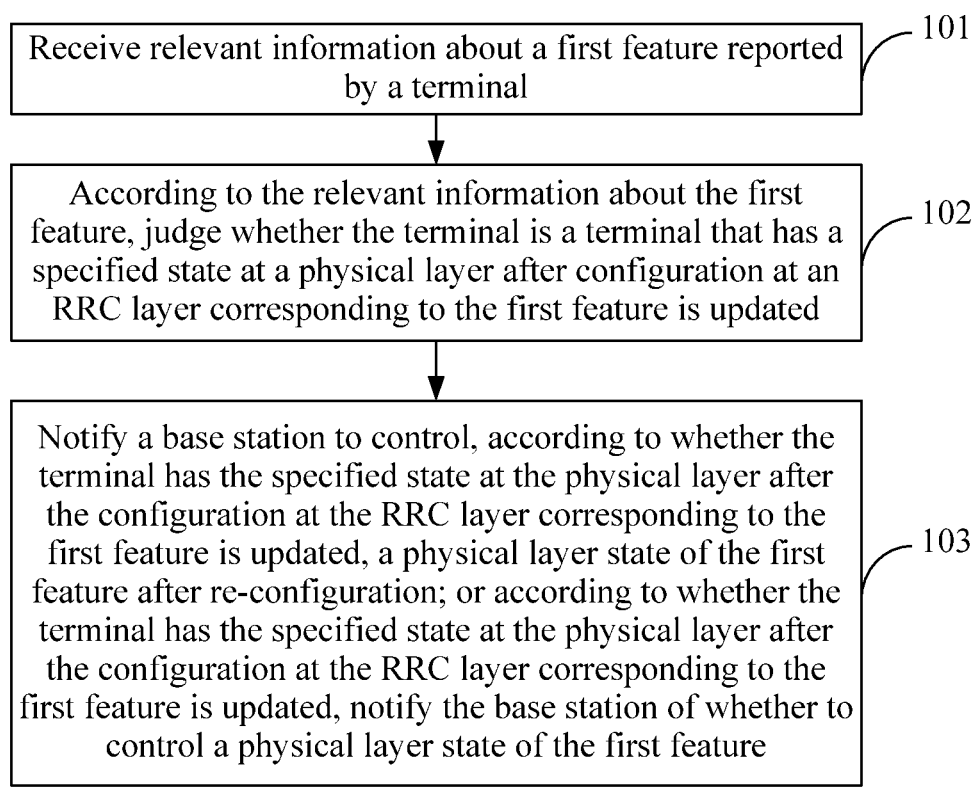
FIG. 1 is a flowchart of a method for synchronizing a physical layer state according to an embodiment of the present invention.

To make the objectives, technical solutions, and advantages of the present invention more comprehensible, the embodiments of the present invention are described in further detail in the following with reference to the accompanying drawings.

Various technologies described herein may be applied to various wireless communications systems, for example UMTS systems, and other such communications systems. The UMTS systems include: TDD (time division duplexing) systems and FDD (frequency division duplexing) systems. The terms "system" and "network" are often interchangeable herein.

A terminal may be a wireless terminal, or a wired terminal. The wireless terminal may refer to a device that provides voice and/or data connectivity for users, such as a handheld device that has a wireless connection function, or other processing device that is connected to a wireless modem. The wireless terminal may communicate with one or more core networks through a wireless access network (for example, RAN, Radio Access Network). The wireless terminal may be a mobile terminal, such as a mobile phone (or also called "cellular" phone) and a computer that has a mobile terminal, and for example, may be a portable, pocket-size, handheld, computer-integrated or vehicle-mounted mobile apparatus, which exchanges languages and/or data with the wireless access network. For example, a personal communication service (PCS) telephone, a cordless telephone, a session initiation protocol (SIP) phone, a wireless local loop (WLL) station, a personal digital assistant (PDA) or the like. The wireless terminal may also be called a system, a subscriber unit, a subscriber station, a mobile station, a mobile, a remote station, an access point, a remote terminal, an access terminal, a user terminal, a user agent, a user device, or a user equipment.

A base station (for example, an access point) may refer to a device in an access network that communicates with a wireless terminal via an air interface through one or multiple sectors. The base station may be configured to mutually convert the received air frame and IP packet, and serve as a router between the wireless terminal and the rest part of the access network, where the rest part of the access network may include an Internet protocol (IP) network. The base station may further coordinate attribute management for the air interface. For example, the base station may be a base station (NodeB) in a UMTS, which is not limited in the present invention.

A base station controller may be a radio network controller (RNC) in a UMTS, which is not limited in the present invention.

In addition, the term "and/or" herein is merely an association relationship that describes associated objects, which indicates that three relationships may exist, for example, A and/or B may indicate three scenarios in which A exists alone, A and B exist at the same time, and B exists alone. In addition, the character "/" herein generally indicates an "or" relationship between the associated objects.

However, for ease of description, the embodiments of the present invention are illustrated by taking a UMTS system as an example.

The embodiments of the present invention relate to a first feature, where the first feature indicates a feature that supports an activated state or a deactivated state at the physical layer, and includes but is not limited to at least one of the following: DTX/DRX feature, HS-SCCH less feature, and DC-HSDPA feature and DC-HSUPA feature.

An enabled state or a disabled state of the first feature is maintained at the RRC layer between an SRNC (serving radio network controller) at the network side and a terminal, and an activated state or a deactivated state of the first feature is maintained at the physical layer between a base station NodeB and the terminal.

In a DTX/DRX activated state, the terminal performs discontinuous transmission at the uplink or discontinuous reception at the downlink; in a DTX/DRX deactivated state, the terminal performs continuous transmission at the uplink or continuous reception at the downlink.

In an HS-SCCH less activated state, the terminal is not indicated on the HS-SCCH channel during first-time transmission of HSDPA data, and the terminal is indicated on the HS-SCCH channel during data retransmission; in an HS-SCCH less deactivated state, the terminal is indicated on the HS-SCCH channel during every HSDPA data transmission.

In a DC-HSDPA activated state, HSDPA data may be received at the same time in the dual cells; in a DC-HSDPA deactivated state, HSDPA data can only be received in the primary cell of the dual cells, but HSDPA data cannot be received in the secondary cell.

In a DC-HSUPA activated state, HSUPA data may be sent at the same time in the dual cells; in a DC-HSUPA deactivated state, HSUPA data can only be sent in the primary cell of the dual cells, but HSUPA data cannot be sent in the secondary cell.

Referring to FIG. 1, this embodiment provides a method for synchronizing a physical layer state, where the method for synchronizing a physical layer state is mainly executed by an SRNC, and may be described as follows:

101: Receive relevant information about a first feature reported by a terminal.

102: According to the relevant information about the first feature, judge whether the terminal is a terminal that has a specified state at a physical layer after configuration at an RRC layer corresponding to the first feature is updated.

103: Notify a base station to control, according to whether the terminal has the specified state at the physical layer after the configuration at the RRC layer corresponding to the first feature is updated, a physical layer state of the first feature after re-configuration; or, according to whether the terminal has the specified state at the physical layer after the configuration at the RRC layer corresponding to the first feature is updated, notify the base station of whether to control a physical layer state of the first feature.

In another embodiment of the present invention, 102 may include: according to access layer version information of the terminal in the relevant information about the first feature and capability information about the first feature, judging a version of the terminal and judging whether the terminal has a capability of supporting the first feature; and if the version of the terminal is a first version and the terminal has the capability of supporting the first feature, determining that the terminal is a terminal that has no specified state at the physical layer after the configuration at the RRC layer corresponding to the first feature is updated; or if the version of the terminal is a second version and the terminal has the capability of supporting the first feature, determining that the terminal is a terminal that has a specified state at the physical layer after the configuration at the RRC layer corresponding to the first feature is updated.

In this embodiment, the first version refers to R8 or a version earlier than R8, and the second version refers to R9 or a version later than R9.

In another embodiment of the present invention, 102 may include: judging, by the SRNC, whether the relevant information about the first feature includes indication information about the physical layer state, where the indication information about the physical layer state is used to indicate the physical layer state of the terminal after the configuration at the RRC layer corresponding to the first feature is updated; and if the relevant information about the first feature includes the indication information about the physical layer state, determining that the terminal is a terminal that has a specified state at the physical layer after the configuration at the RRC layer corresponding to the first feature is updated; or, if the relevant information about the first feature does not include the indication information about the physical layer state, determining that the terminal is a terminal that has no specified state at the physical layer after the configuration at the RRC layer corresponding to the first feature is updated.

In another embodiment of the present invention, when the relevant information about the first feature includes the indication information about the physical layer state, the SRNC judges, according to the indication information about the physical layer state, whether the physical layer state of the terminal after the configuration at the RRC layer corresponding to the first feature is updated is an activated state or a deactivated state; and if it is the activated state, sends a first message to the base station to notify the base station that the physical layer state of the terminal after the configuration at the RRC layer corresponding to the first feature is updated is the activated state; or, if it is the deactivated state, sends a first message to the base station to notify the base station that the physical layer state of the terminal after the configuration at the RRC layer corresponding to the first feature is updated is the deactivated state.

In this embodiment, the SRNC may notify the base station to control, according to whether the terminal has the specified state at the physical layer after the configuration at the RRC layer corresponding to the first feature is updated, the physical layer state of the first feature after re-configuration by using any one of the following modes:

First mode: if the terminal is a terminal that has a specified state at the physical layer after the configuration at the RRC layer corresponding to the first feature is updated, the SRNC notifies the base station to ensure that the physical layer state of the first feature after re-configuration is the same as the specified state; or, if the terminal is a terminal that has no specified state at the physical layer after the configuration at the RRC layer corresponding to the first feature is updated, the SRNC notifies the base station to send, after the terminal updates the configuration at the RRC layer corresponding to the first feature, a high speed shared control channel (HS-SCCH) order to synchronize with the physical layer state of the first feature of the terminal.

Second mode: if the terminal is a terminal that has a specified state at the physical layer after the configuration at the RRC layer corresponding to the first feature is updated, the SRNC sends a first message to the base station to notify the base station to ensure that the physical layer state of the first feature after re-configuration is the same as the specified state; or, if the terminal is a terminal that has no specified state at the physical layer after the configuration at the RRC layer corresponding to the first feature is updated, the SRNC does not send a first message to the base station, and notifies the base station to send, after the terminal updates the configuration at the RRC layer corresponding to the first feature, an HS-SCCH order to synchronize with the physical layer state of the first feature of the terminal.

Third mode: if the terminal is a terminal that has a specified state at the physical layer after the configuration at the RRC layer corresponding to the first feature is updated, the SRNC does not send a first message to the base station, and notifies the base station to ensure that the physical layer state of the first feature after re-configuration is the same as the specified state; or, if the terminal is a terminal that has no specified state at the physical layer after the configuration at the RRC layer corresponding to the first feature is updated, the SRNC sends a first message to the base station to notify the base station to send, after the terminal updates the configuration at the RRC layer corresponding to the first feature, an HS-SCCH order to synchronize with the physical layer state of the first feature of the terminal.

Fourth mode: if the terminal is a terminal that has a specified state at the physical layer after the configuration at the RRC layer corresponding to the first feature is updated, the SRNC sends a first message to the base station to notify the base station to ensure that the physical layer state of the first feature after re-configuration is the same as the specified state; or, if the terminal is a terminal that has no specified state at the physical layer after the configuration at the RRC layer corresponding to the first feature is updated, the SRNC sends a first message to the base station to notify the base station to send, after the terminal updates the configuration at the RRC layer corresponding to the first feature, an HS-SCCH order to synchronize with the physical layer state of the first feature of the terminal.

The sending a first message to the base station involved in any place in this embodiment may include: sending, by the SRNC, the first message through an Iub interface to the base station; or, sending, by the SRNC, the first message through an Iur interface to a DRNC (drift radio network controller) so that the DRNC forwards the first message to the base station.

The first message involved in any place in this embodiment may be a signaling or FP (frame protocol) data frame.

In this embodiment, the according to whether the terminal has the specified state at the physical layer after the configuration at the RRC layer corresponding to the first feature is updated, notifying a base station of whether to control a physical layer state of the first feature in 103 may include: if the terminal is a terminal that has a specified state at the physical layer after the configuration at the RRC layer corresponding to the first feature is updated, notifying the base station to send a high speed shared control channel (HS-SCCH) order to control the physical layer state of the first feature; or if the terminal is a terminal that has no specified state at the physical layer after the configuration at the RRC layer corresponding to the first feature is updated, notifying the base station not to send a high speed shared control channel (HS-SCCH) order to control the physical layer state of the first feature.

According to the method provided in this embodiment, an SRNC judges, according to relevant information about a first feature reported by a terminal, whether the terminal is a terminal that has a specified state at a physical layer after configuration at an RRC layer corresponding to the first feature is updated, and accordingly notifies a base station to control, according to whether the terminal has the specified state at the physical layer after the configuration at the RRC layer corresponding to the first feature is updated, a physical layer state of the first feature after re-configuration, so that after the terminal updates the configuration at the RRC layer corresponding to the first feature, the network side can synchronize with the physical layer state of the first feature of the terminal, which solves the problem where the physical layer state of a feature at the terminal may be different from that at the network side, thereby avoiding loss during data transmission and preventing call drops of the terminal.

Figure 2:
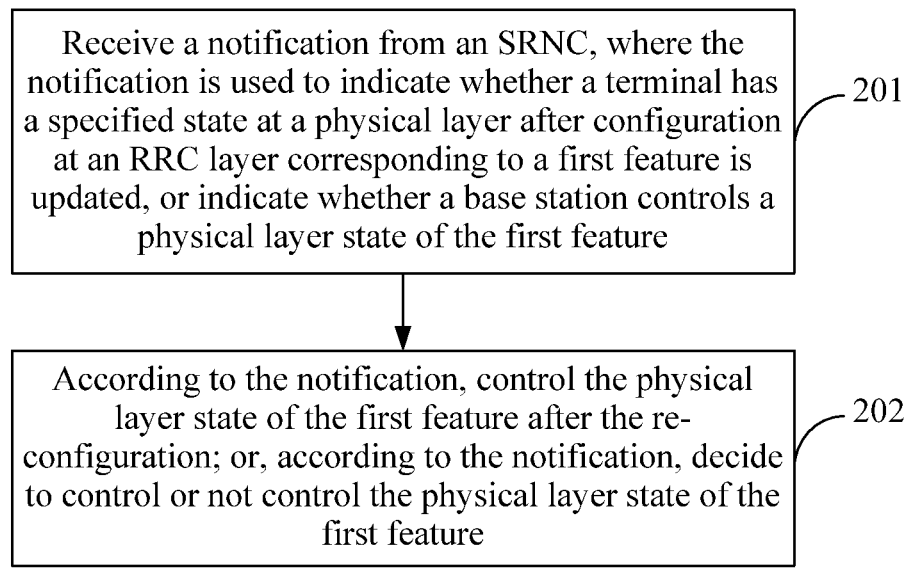
FIG. 2 is a flowchart of a method for synchronizing a physical layer state according to another embodiment of the present invention.

Referring to FIG. 2, this embodiment further provides a method for synchronizing a physical layer state, where the method for synchronizing a physical layer state is mainly executed by a base station, and may be described as follows:

201: Receive a notification from an SRNC, where the notification is used to indicate whether a terminal has a specified state at a physical layer after configuration at an RRC layer corresponding to a first feature is updated, or indicate whether a base station controls a physical layer state of the first feature.

202: According to the notification, control the physical layer state of the first feature after the re-configuration; or, according to the notification, decide to control or not control the physical layer state of the first feature.

In another embodiment of the present invention, the according to the notification, controlling the physical layer state of the first feature after the re-configuration in 202 may include: if the notification is a first message that indicates that the physical layer state of the terminal after the configuration at the RRC layer corresponding to the first feature is updated is an activated state, after the terminal updates the configuration at the RRC layer corresponding to the first feature, configuring, by the base station, the physical layer state of the first feature as the activated state; or, if the notification is a first message that indicates that the physical layer state of the terminal after the configuration at the RRC layer corresponding to the first feature is updated is a deactivated state, after the terminal updates the configuration at the RRC layer corresponding to the first feature, configuring, by the base station, the physical layer state of the first feature as the deactivated state.

In another embodiment of the present invention, the according to the notification, controlling the physical layer state of the first feature after the re-configuration in 202 may include: if the notification indicates that the terminal has a specified state at the physical layer after the configuration at the RRC layer corresponding to the first feature is updated, ensuring, by the base station, that the physical layer state of the first feature after the re-configuration is the same as the specified state; or, if the notification indicates that the terminal has no specified state at the physical layer after the configuration at the RRC layer corresponding to the first feature is updated, after the terminal updates the configuration at the RRC layer corresponding to the first feature, sending, by the base station, a high speed shared control channel (HS-SCCH) order to synchronize with the physical layer state of the first feature of the terminal.

In another embodiment of the present invention, the according to the notification, controlling the physical layer state of the first feature after the re-configuration in 202 may include:

if the base station receives a first message sent from the SRNC, ensuring, by the base station, that the physical layer state of the first feature after the re-configuration is the same as the specified state; or, if the base station does not receive a first message sent from the SRNC, after the terminal updates the configuration at the RRC layer corresponding to the first feature, sending, by the base station, an HS-SCCH order to synchronize with the physical layer state of the first feature of the terminal; or, if the base station does not receive a first message sent from the SRNC, ensuring, by the base station, that the physical layer state of the first feature after the re-configuration is the same as the specified state; or, if the base station receives a first message sent from the SRNC, after the terminal updates the configuration at the RRC layer corresponding to the first feature, sending, by the base station, an HS-SCCH order to synchronize with the physical layer state of the first feature of the terminal; or, if the base station receives a first message sent from the SRNC, and the first message indicates that the terminal has a specified state at the physical layer after the configuration at the RRC layer corresponding to the first feature is updated, ensuring, by the base station, that the physical layer state of the first feature after the re-configuration is the same as the specified state; or, if the base station receives a first message sent from the SRNC, and the first message indicates that the terminal has no specified state at the physical layer after the configuration at the RRC layer corresponding to the first feature is updated, after the terminal updates the configuration at the RRC layer corresponding to the first feature, sending, by the base station, an HS-SCCH order to synchronize with the physical layer state of the first feature of the terminal.

In another embodiment of the present invention, the according to the notification, deciding to control or not control the physical layer state of the first feature in 202 includes: if the notification instructs the base station to send an HS-SCCH order, sending, by the base station, the HS-SCCH order to control the physical layer state of the first feature; or, if the notification instructs the base station not to send an HS-SCCH order, not controlling, by the base station, the physical layer state of the first feature.

According to the method provided in this embodiment, by receiving a notification from an SRNC, a base station controls, according to the notification, a physical layer state of a first feature after re-configuration, so that after the terminal updates the configuration at the RRC layer corresponding to the first feature, the network side can synchronize with the physical layer state of the terminal, which solves the problem where the physical layer state of a feature at the terminal may be inconsistent with that at the network side, thereby avoiding loss during data transmission and preventing call drops of the terminal.

Figure 3:
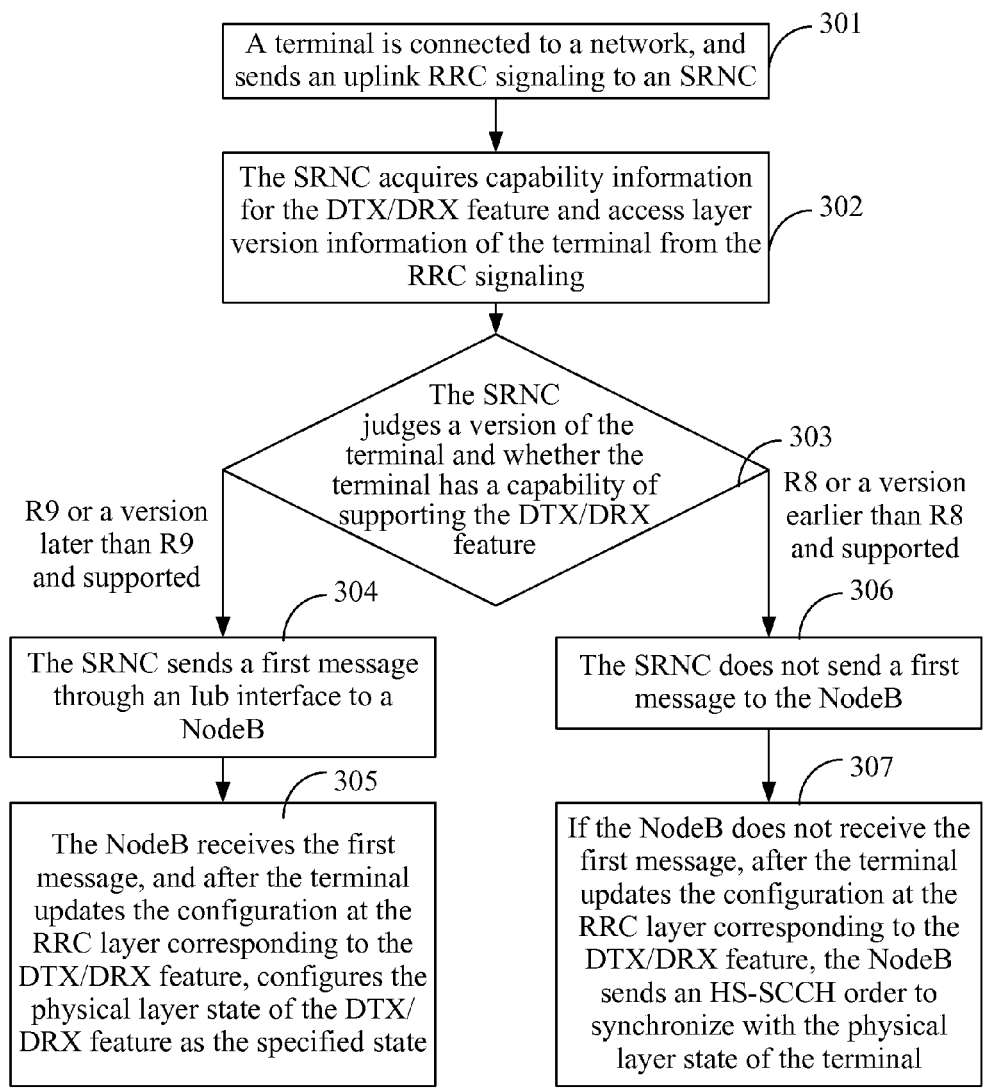
FIG. 3 is a flowchart of a method for synchronizing a physical layer state according to another embodiment of the present invention.

Referring to FIG. 3, this embodiment provides a method for synchronizing a physical layer state, which is illustrated by taking the DTX/DRX feature as an example, and may be described as follows:

301: A terminal is connected to a network, and sends an uplink RRC signaling to an SRNC.

Here, capability information for the DTX/DRX feature and access layer version information of the terminal are carried in the uplink RRC signaling.

302: After receiving the RRC signaling sent from the terminal, the SRNC acquires the capability information for the DTX/DRX feature of the terminal and the access layer version information of the terminal from the RRC signaling.

303: The SRNC judges, according to the capability information for the DTX/DRX feature of the terminal and the access layer version information of the terminal, a version of the terminal and whether the terminal has a capability of supporting a first feature.

For example, if the version of the terminal is R9 or a version later than R9 and the terminal has the capability of supporting the first feature, 304 is executed; if the version of the terminal is R8 or a version earlier than R8 and the terminal has the capability of supporting the first feature, 306 is executed.

304: The SRNC determines that the terminal is a terminal that has a specified state at a physical layer after configuration at an RRC layer corresponding to the DTX/DRX feature is updated, and accordingly sends a first message through an Iub interface to a NodeB to notify the NodeB to ensure that the physical layer state of the DTX/DRX feature after re-configuration is the same as the specified state.

305: The NodeB receives the first message, and, after the terminal updates the configuration at the RRC layer corresponding to the DTX/DRX feature, configures the physical layer state of the DTX/DRX feature as the specified state, which may avoid sending an HS-SCCH order, thereby saving overhead of the HS-SCCH signaling.

Here, the specified state may be clearly regulated in the protocol, for example, if the protocol regulates that "the physical layer state after the configuration at the RRC layer corresponding to the DTX/DRX feature is an activated state", the NodeB configures, after the terminal updates the configuration at the RRC layer corresponding to the DTX/DRX feature, the physical layer state of the DTX/DRX feature as the activated state.

306: The SRNC determines that the terminal is a terminal that has no specified state at the physical layer after the configuration at the RRC layer corresponding to the DTX/DRX feature is updated, and accordingly does not send a first message to the NodeB.

307: If the NodeB does not receive the first message, after the terminal updates the configuration at the RRC layer corresponding to the DTX/DRX feature, the NodeB sends an HS-SCCH order to synchronize with the physical layer state of the DTX/DRX feature of the terminal.

Figure 4:
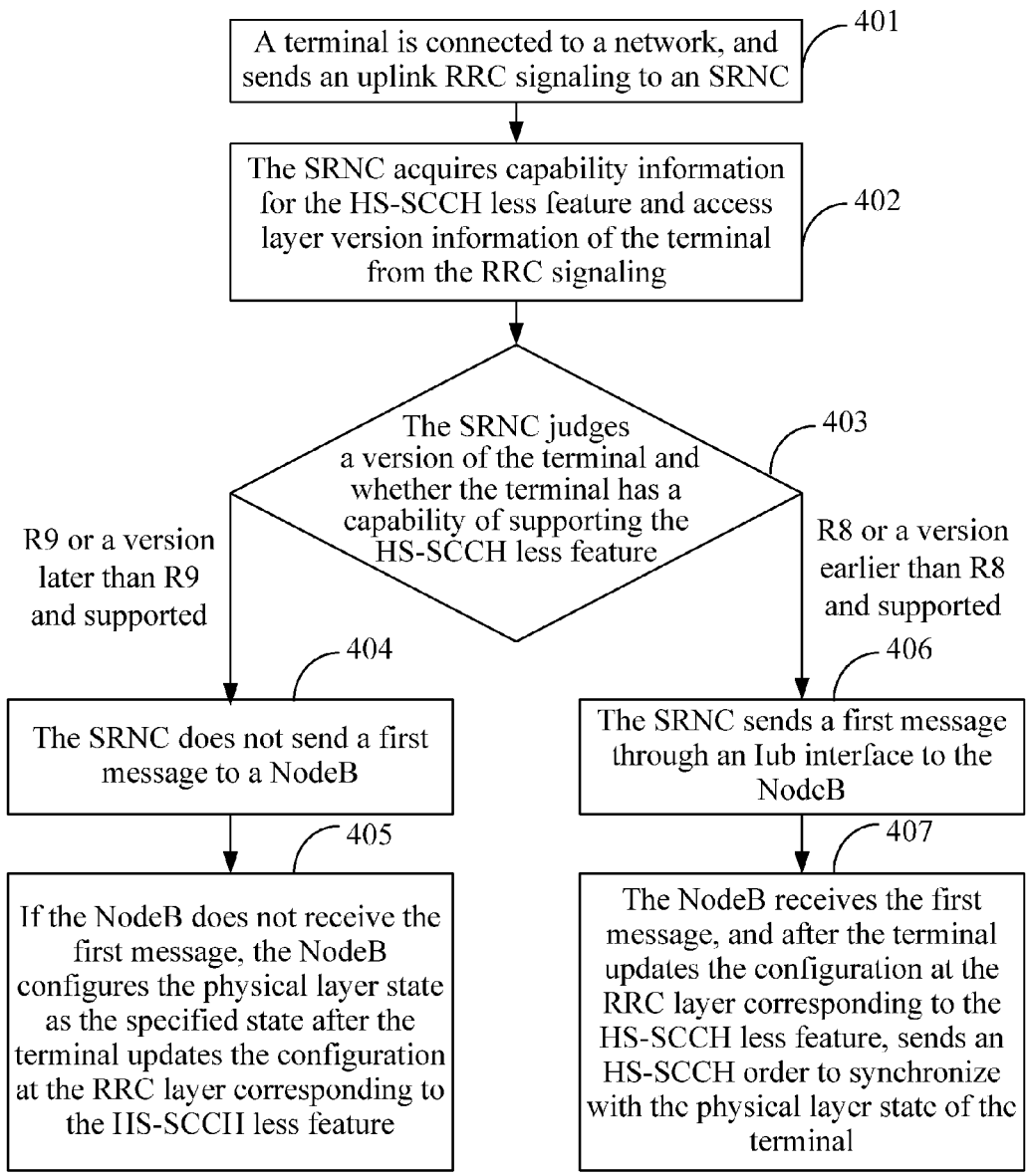
FIG. 4 is a flowchart of a method for synchronizing a physical layer state according to another embodiment of the present invention.

Referring to FIG. 4, this embodiment provides a method for synchronizing a physical layer state, which is illustrated by taking the HS-SCCH less feature as an example, and may be described as follows:

401: A terminal is connected to a network, and sends an uplink RRC signaling to an SRNC.

Here, capability information for the HS-SCCH less feature and access layer version information of the terminal are carried in the uplink RRC signaling.

402: After receiving the RRC signaling sent from the terminal, the SRNC acquires the capability information for the HS-SCCH less feature of the terminal and the access layer version information of the terminal from the RRC signaling.

403: The SRNC judges, according to the capability information for the HS-SCCH less feature of the terminal and the access layer version information of the terminal, a version of the terminal and whether the terminal has a capability of supporting a first feature; if the version of the terminal is R9 or a version later than R9 and the terminal has the capability of supporting the first feature, 404 is executed; if the version of the terminal is R8 or a version earlier than R8 and the terminal has the capability of supporting the first feature, 406 is executed.

404: The SRNC determines that the terminal is a terminal that has a specified state at a physical layer after configuration at an RRC layer corresponding to the HS-SCCH less feature is updated, and accordingly does not send a first message to a NodeB, and notifies the NodeB to ensure that the physical layer state of the HS-SCCH less feature after re-configuration is the same as the specified state.

405: If the NodeB does not receive the first message, after the terminal updates the configuration at the RRC layer corresponding to the HS-SCCH less feature, the NodeB configures the physical layer state of the HS-SCCH less feature as the specified state, which may avoid sending an HS-SCCH order, thereby saving overhead of the HS-SCCH signaling.

Here, the specified state may be clearly regulated in the protocol, for example, if the protocol regulates that "the physical layer state after the configuration at the RRC layer corresponding to the HS-SCCH less feature is a deactivated state", the NodeB configures, after the terminal updates the configuration at the RRC layer corresponding to the HS-SCCH less feature, the physical layer state of the HS-SCCH less feature as the deactivated state.

406: The SRNC determines that the terminal is a terminal that has no specified state at the physical layer after the configuration at the RRC layer corresponding to the HS-SCCH less feature is updated, and accordingly sends a first message to the NodeB.

407: The NodeB receives the first message, and after the terminal updates the configuration at the RRC layer corresponding to the HS-SCCH less feature, sends an HS-SCCH order to synchronize with the physical layer state of the HS-SCCH less feature of the terminal.

Figure 5:
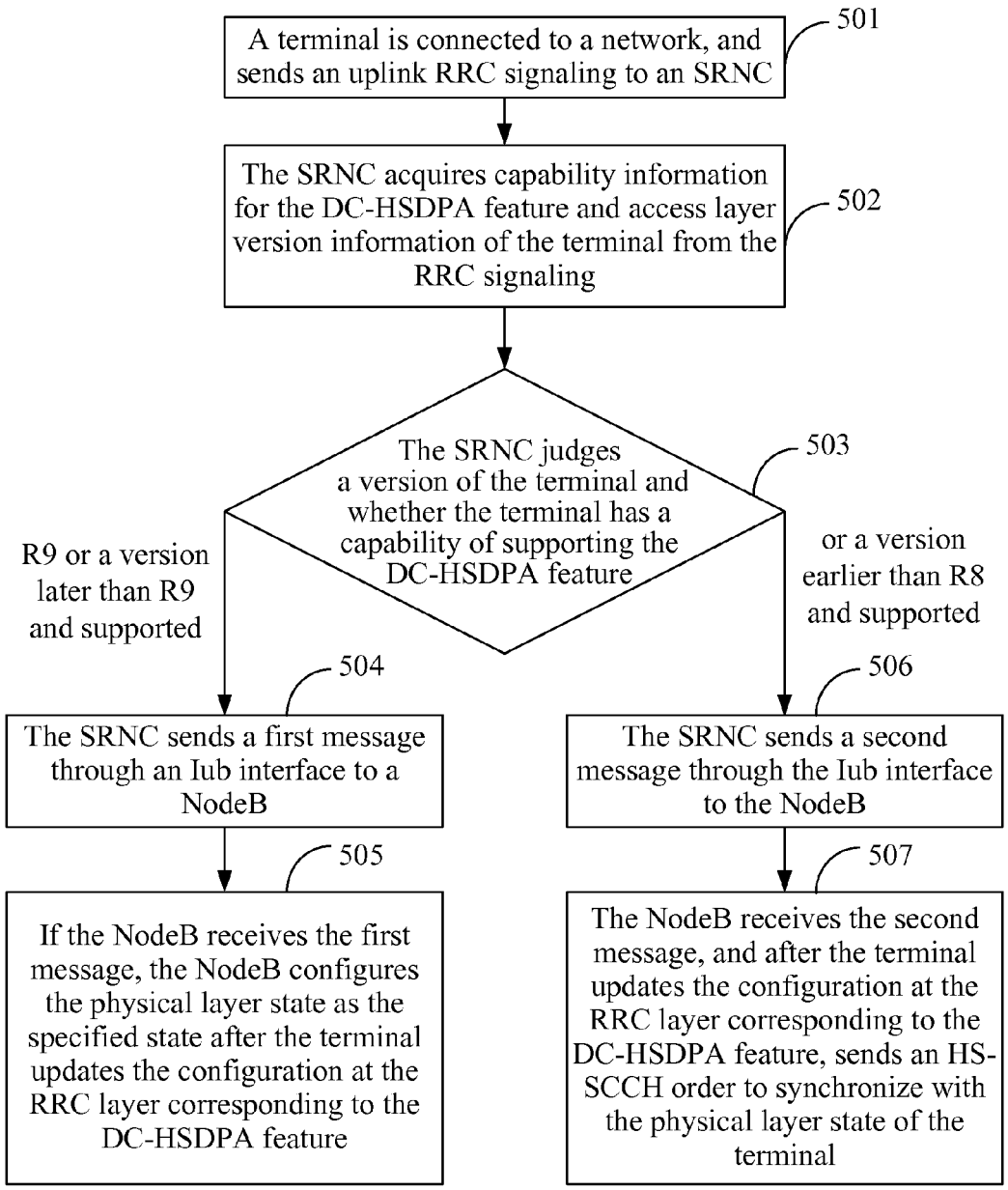
FIG. 5 is a flowchart of a method for synchronizing a physical layer state according to another embodiment of the present invention.

Referring to FIG. 5, this embodiment provides a method for synchronizing a physical layer state, which is illustrated by taking the DC-HSDPA feature as an example, and may be described as follows:

501: A terminal is connected to a network, and sends an uplink RRC signaling to an SRNC.

Here, capability information for the DC-HSDPA feature and access layer version information of the terminal are carried in the uplink RRC signaling.

502: After receiving the RRC signaling sent from the terminal, the SRNC acquires the capability information for the DC-HSDPA feature of the terminal and the access layer version information of the terminal from the RRC signaling.

503: The SRNC judges, according to the capability information for the DC-HSDPA feature of the terminal and the access layer version information of the terminal, a version of the terminal and whether the terminal has a capability of supporting a first feature; if the version of the terminal is R9 or a version later than R9 and the terminal has the capability of supporting the first feature, 504 is executed; if the version of the terminal is R8 or a version earlier than R8 and the terminal has the capability of supporting the first feature, 506 is executed.

504: The SRNC determines that the terminal is a terminal that has a specified state at a physical layer after configuration at an RRC layer corresponding to the DC-HSDPA feature is updated, and accordingly sends a first message through an Iub interface to a NodeB, where the first message is used to instruct the NodeB to ensure that the physical layer state of the DC-HSDPA feature after re-configuration is the same as the specified state.

505: The NodeB receives the first message, and, after the terminal updates the configuration at the RRC layer corresponding to the DC-HSDPA feature, configures the physical layer state of the DC-HSDPA feature as the specified state without sending an HS-SCCH order, thereby saving overhead of the HS-SCCH signaling.

Here, the specified state may be clearly regulated in the protocol, for example, if the protocol regulates that "the physical layer state after the configuration at the RRC layer corresponding to the DC-HSDPA feature is an activated state", the NodeB configures, after the terminal updates the configuration at the RRC layer corresponding to the DC-HSDPA feature, the physical layer state of the DC-HSDPA feature as the activated state.

506: The SRNC determines that the terminal is a terminal that has no specified state at the physical layer after the configuration at the RRC layer corresponding to the DC-HSDPA feature is updated, and accordingly sends a second message through the Iub interface to the NodeB, where the second message is used to instruct the NodeB to send, after the terminal updates the configuration at the RRC layer corresponding to the DC-HSDPA feature, an HS-SCCH order to synchronize with the physical layer state of the DC-HSDPA feature of the terminal.

507: The NodeB receives the second message, and after the terminal updates the configuration at the RRC layer corresponding to the DC-HSDPA feature, sends an HS-SCCH order to synchronize with the physical layer state of the DC-HSDPA feature of the terminal.

Figure 6:
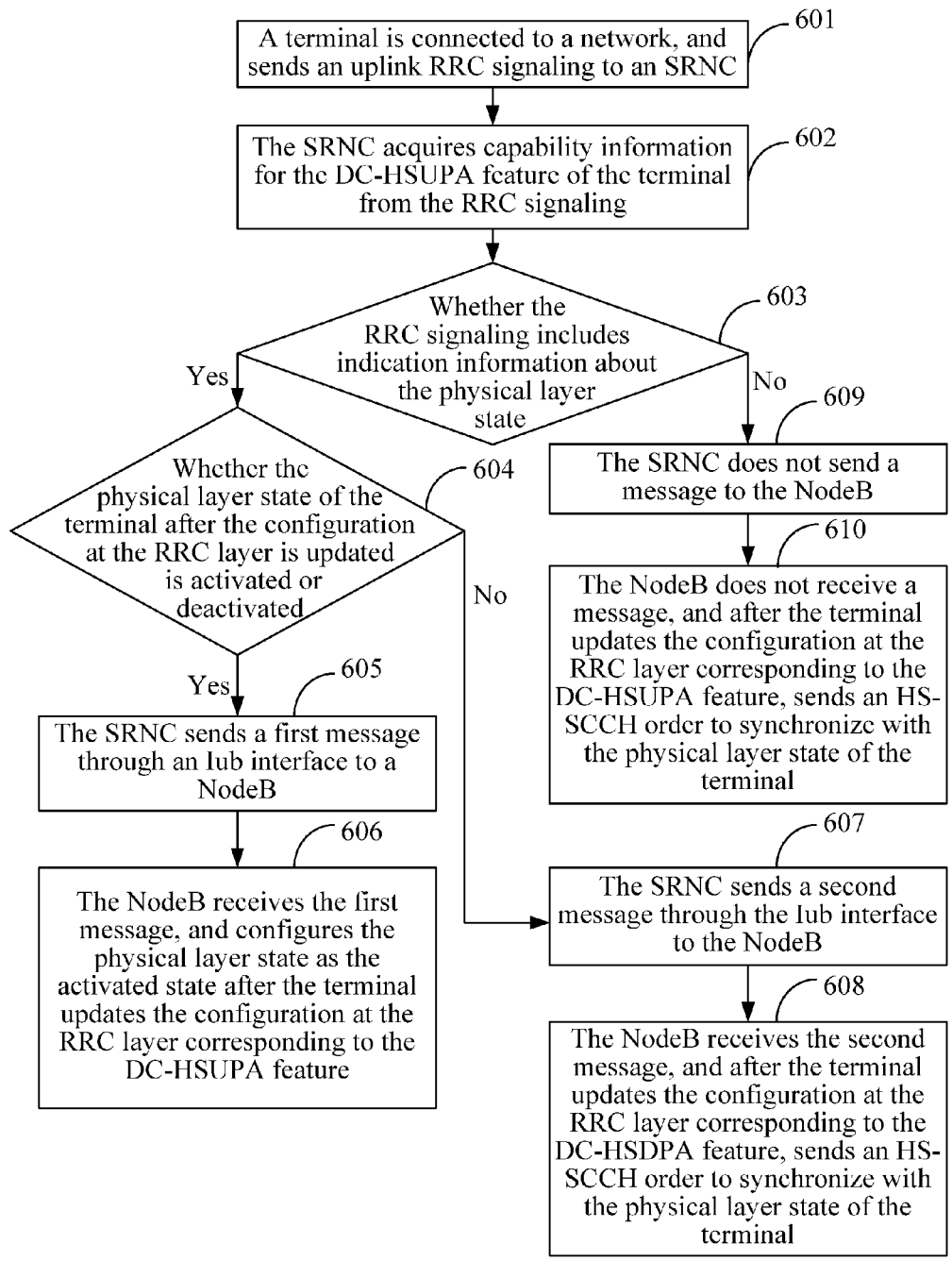
FIG. 6 is a flowchart of a method for synchronizing a physical layer state according to another embodiment of the present invention.

Referring to FIG. 6, this embodiment provides a method for synchronizing a physical layer state, which is illustrated by taking the DC-HSUPA feature as an example, and may be described as follows:

601: A terminal is connected to a network, and sends an uplink RRC signaling to an SRNC.

Here, capability information for the DC-HSUPA feature is carried in the uplink RRC signaling.

602: After receiving the RRC signaling sent from the terminal, the SRNC acquires the capability information for the DC-HSUPA feature of the terminal from the RRC signaling.

603: The SRNC judges whether the RRC signaling includes indication information about the physical layer state of the terminal; if yes, 604 is executed; otherwise, 609 is executed.

604: The SRNC determines that the terminal is a terminal that has a specified state at a physical layer after configuration at an RRC layer corresponding to the DC-HSUPA feature is updated, and accordingly further judges, according to the indication information about the physical layer state, whether the physical layer state of the terminal after the configuration at the RRC layer corresponding to the DC-HSUPA feature is updated is an activated state or a deactivated state; if it is the activated state, 605 is executed; if it is the deactivated state, 607 is executed.

Here, the indication information about the physical layer state may be expressed by using multiple forms, for example, true may be used to indicate that the physical layer state of the terminal after the configuration at the RRC layer is updated is the activated state; false is used to indicate that the physical layer state of the terminal after the configuration at the RRC layer is updated is the deactivated state, which is not particularly limited in the embodiment of the present invention.

605: Send a first message through an Iub interface to a NodeB, where the first message is used to indicate that the physical layer state after the terminal updates the configuration at the RRC layer corresponding to the DC-HSUPA feature is the activated state.

606: The NodeB receives the first message, and after the terminal updates the configuration at the RRC layer corresponding to the DC-HSUPA feature, configures the physical layer state of the DC-HSUPA feature as the activated state.

607: Send a second message through the Iub interface to the NodeB, where the second message is used to indicate that the physical layer state after the terminal updates the configuration at the RRC layer corresponding to the DC-HSUPA feature is the deactivated state.

608: The NodeB receives the second message, and after the terminal updates the configuration at the RRC layer corresponding to the DC-HSUPA feature, configures the physical layer state of the DC-HSUPA feature as the deactivated state.

609: The SRNC determines that the terminal is a terminal that has no specified state at the physical layer after the configuration at the RRC layer corresponding to the DC-HSUPA feature is updated, and accordingly does not send a message to the NodeB.

610: If the NodeB does not receive a message from the SRNC, after the terminal updates the configuration at the RRC layer corresponding to the DC-HSUPA feature, the NodeB sends an HS-SCCH order to synchronize with the physical layer state of the DC-HSUPA feature of the terminal.

Definitely, 609 and 610 may also be replaced as follows: The SRNC determines that the terminal is a terminal that has no specified state at the physical layer after the configuration at the RRC layer corresponding to the DC-HSUPA feature is updated, and accordingly sends a third message through the Iub interface to the NodeB, where the third message is used to instruct the NodeB to send, after the terminal updates the configuration at the RRC layer corresponding to the DC-HSUPA feature, an HS-SCCH order to synchronize with the physical layer state of the DC-HSUPA feature of the terminal; the NodeB receives the third message, and after the terminal updates the configuration at the RRC layer corresponding to the DC-HSUPA feature, sends an HS-SCCH order to synchronize with the physical layer state of the DC-HSUPA feature of the terminal.

In this embodiment, the SRNC may further control the NodeB whether to send the HS-SCCH order to ensure synchronization with the physical layer state of the terminal, thereby avoiding inconsistency between the physical layer states of the first feature at the terminal and the network side. The specific description may be as follows:

If the SRNC judges that the terminal is a terminal that has a specified state at the physical layer after the configuration at the RRC layer corresponding to the first feature is updated, the NodeB is notified to send an HS-SCCH order to control the physical layer state of the first feature; or, if the SRNC judges that the terminal is a terminal that has no specified state at the physical layer after the configuration at the RRC layer corresponding to the first feature is updated, the NodeB is notified not to send an HS-SCCH order to control the physical layer state of the first feature.

Any one message sent by the SRNC to the base station involved in this embodiment may be sent through the Iub interface to the base station; or sent through the Iur interface to the DRNC, and then forwarded by the DRNC to the base station. Here, the any one message may be a signaling or FP data frame.

In this embodiment, when being connected to the network, the terminal may further report one or more of the DTX/DRX feature, HS-SCCH less feature, DC-HSDPA feature, and DC-HSUPA feature, which is not particularly limited in the embodiment of the present invention.

According to the method provided in this embodiment, it is judged, according to relevant information about a first feature reported by a terminal, whether the terminal is a terminal that has a specified state at a physical layer after configuration at an RRC layer corresponding to the first feature is updated, and a NodeB is notified accordingly to control, according to whether the terminal has the specified state at the physical layer after the configuration at the RRC layer corresponding to the first feature is updated, a physical layer state of the first feature after re-configuration, so that after the terminal updates the configuration at the RRC layer corresponding to the first feature, the network side can synchronize with the physical layer state of the first feature of the terminal, which solves the problem where the physical layer state of a feature at the terminal may be different from that at the network side, thereby avoiding loss during data transmission and preventing call drops of the terminal.

Here, during notification of the base station, notification may be performed by using the mode of sending a message, or may also be performed by using the mode of not sending a message, thereby achieving high flexibility.

Further, for a terminal that has a specified state at the physical layer after the configuration at the RRC layer corresponding to the first feature is updated, the NodeB does not need to send an HS-SCCH order to synchronize with the physical layer state of the feature of the terminal, which greatly saves overhead of the HS-SCCH signaling, thereby saving precious wireless network resources.

Figure 7:
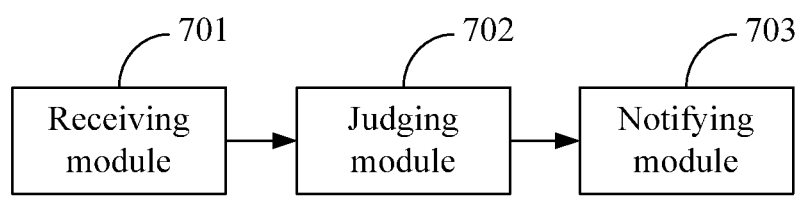
FIG. 7 is a structural diagram of an SRNC according to another embodiment of the present invention.

Referring to FIG. 7, this embodiment provides an SRNC, including: a receiving module 701, a judging module 702, and a notifying module 703.

The receiving module 701 is configured to receive relevant information about a first feature reported by a terminal.

The judging module 702 is configured to: according to the relevant information about the first feature, judge whether the terminal is a terminal that has a specified state at a physical layer after configuration at a radio resource control (RRC) layer corresponding to the first feature is updated.

The notifying module 703 is configured to notify a base station to control, according to whether the terminal has the specified state at the physical layer after the configuration at the RRC layer corresponding to the first feature is updated, a physical layer state of the first feature after re-configuration; or, according to whether the terminal has the specified state at the physical layer after the configuration at the RRC layer corresponding to the first feature is updated, notify the base station of whether to control a physical layer state of the first feature.

In another embodiment of the present invention, the judging module 702 may include: a first judging unit, or, a second judging unit.

The first judging unit is configured to: according to access layer version information of the terminal in the relevant information about the first feature and capability information about the first feature, judge a version of the terminal and judge whether the terminal has a capability of supporting the first feature; and if the version of the terminal is a first version and the terminal has the capability of supporting the first feature, determine that the terminal is a terminal that has no specified state at the physical layer after the configuration at the RRC layer corresponding to the first feature is updated; or, if the version of the terminal is a second version and the terminal has the capability of supporting the first feature, determine that the terminal is a terminal that has a specified state at the physical layer after the configuration at the RRC layer corresponding to the first feature is updated.

The second judging unit is configured to judge whether the relevant information about the first feature includes indication information about the physical layer state, where the indication information about the physical layer state is used to indicate the physical layer state of the terminal after the configuration at the RRC layer corresponding to the first feature is updated; or, if yes, determine that the terminal is a terminal that has a specified state at the physical layer after the configuration at the RRC layer corresponding to the first feature is updated; otherwise, determine that the terminal is a terminal that has no specified state at the physical layer after the configuration at the RRC layer corresponding to the first feature is updated.

In another embodiment of the present invention, the judging module 702 may include: a third judging unit, configured to: when the second judging unit judges that the relevant information about the first feature includes the indication information about the physical layer state, judge, according to the indication information about the physical layer state, whether the physical layer state of the terminal after the configuration at the RRC layer corresponding to the first feature is updated is an activated state or a deactivated state.

Further, the notifying module 703 may include: a first notifying unit, configured to: if it is the activated state, send a first message to the base station to notify the base station that the physical layer state of the terminal after the configuration at the RRC layer corresponding to the first feature is updated is the activated state; or, if it is the deactivated state, send a first message to the base station to notify the base station that the physical layer state of the terminal after the configuration at the RRC layer corresponding to the first feature is updated is the deactivated state.

In another embodiment of the present invention, the notifying module 703 may include: a second notifying unit, a third notifying unit, a fourth notifying unit, a fifth notifying unit, a sixth notifying unit.

The second notifying unit is configured to: if the terminal is a terminal that has a specified state at the physical layer after the configuration at the RRC layer corresponding to the first feature is updated, notify the base station to ensure that the physical layer state of the first feature after re-configuration is the same as the specified state; or, if the terminal is a terminal that has no specified state at the physical layer after the configuration at the RRC layer corresponding to the first feature is updated, notify the base station to send, after the terminal updates the configuration at the RRC layer corresponding to the first feature, a high speed shared control channel (HS-SCCH) order to synchronize with the physical layer state of the first feature of the terminal.

The third notifying unit is configured to: if the terminal is a terminal that has a specified state at the physical layer after the configuration at the RRC layer corresponding to the first feature is updated, send a first message to the base station to notify the base station to ensure that the physical layer state of the first feature after re-configuration is the same as the specified state; or, if the terminal is a terminal that has no specified state at the physical layer after the configuration at the RRC layer corresponding to the first feature is updated, not send a first message to the base station, and notify the base station to send, after the terminal updates the configuration at the RRC layer corresponding to the first feature, an HS-SCCH order to synchronize with the physical layer state of the first feature of the terminal.

The fourth notifying unit is configured to: if the terminal is a terminal that has a specified state at the physical layer after the configuration at the RRC layer corresponding to the first feature is updated, not send a first message to the base station, and notify the base station to ensure that the physical layer state of the first feature after re-configuration is the same as the specified state; or, if the terminal is a terminal that has no specified state at the physical layer after the configuration at the RRC layer corresponding to the first feature is updated, send a first message to the base station to notify the base station to send, after the terminal updates the configuration at the RRC layer corresponding to the first feature, an HS-SCCH order to synchronize with the physical layer state of the first feature of the terminal.

The fifth notifying unit is configured to: if the terminal is a terminal that has a specified state at the physical layer after the configuration at the RRC layer corresponding to the first feature is updated, send a first message to the base station to notify the base station to ensure that the physical layer state of the first feature after re-configuration is the same as the specified state; or, if the terminal is a terminal that has no specified state at the physical layer after the configuration at the RRC layer corresponding to the first feature is updated, send a first message to the base station to notify the base station to send, after the terminal updates the configuration at the RRC layer corresponding to the first feature, an HS-SCCH order to synchronize with the physical layer state of the first feature of the terminal.

The sixth notifying unit is configured to: if the terminal is a terminal that has a specified state at the physical layer after the configuration at the RRC layer corresponding to the first feature is updated, notify the base station to send an HS-SCCH order to control the physical layer state of the first feature; or, if the terminal is a terminal that has no specified state at the physical layer after the configuration at the RRC layer corresponding to the first feature is updated, notify the base station not to send an HS-SCCH order to control the physical layer state of the first feature.

The SRNC provided in this embodiment may execute the method provided in the above method embodiments. For the detailed process, see the method embodiments.

The SRNC provided in this embodiment judges, according to relevant information about a first feature reported by a terminal, whether the terminal is a terminal that has a specified state at a physical layer after configuration at an RRC layer corresponding to the first feature is updated, and accordingly notifies a base station to control, according to whether the terminal has the specified state at the physical layer after the configuration at the RRC layer corresponding to the first feature is updated, a physical layer state of the first feature after re-configuration, so that after the terminal updates the configuration at the RRC layer corresponding to the first feature, the network side can synchronize with the physical layer state of the first feature of the terminal, which solves the problem where the physical layer state of a feature at the terminal may be different from that at the network side, thereby avoiding loss during data transmission and preventing call drops of the terminal.

Here, during notification of the base station, notification may be performed by using the mode of sending a message, or may also be performed by using the mode of not sending a message, thereby achieving high flexibility.

Further, for a terminal that has a specified state at the physical layer after the configuration at the RRC layer corresponding to the first feature is updated, the NodeB does not need to send an HS-SCCH order to synchronize with the physical layer state of the feature of the terminal, which greatly saves overhead of the HS-SCCH signaling, thereby saving precious wireless network resources.

Figure 8:
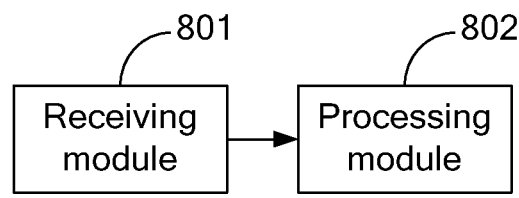
FIG. 8 is a structural diagram of a base station according to another embodiment of the present invention.

Referring to FIG. 8, this embodiment provides a base station, including: a receiving module 801 and a processing module 802.

The receiving module 801 is configured to receive a notification from a serving radio network controller (SRNC) where the notification is used to indicate whether a terminal has a specified state at a physical layer after configuration at a radio resource control (RRC) layer corresponding to a first feature is updated, or indicate whether the base station controls a physical layer state of the first feature; and The processing module 802 is configured to: according to the notification, control the physical layer state of the first feature after the re-configuration, or, according to the notification, decide to control or not control the physical layer state of the first feature.

In another embodiment of the present invention, the processing module 802 may include: an activation processing unit and a deactivation processing unit.

The activation processing unit is configured to: if the notification is a first message that indicates that the physical layer state of the terminal after the configuration at the RRC layer corresponding to the first feature is updated is an activated state, after the terminal updates the configuration at the RRC layer corresponding to the first feature, configure the physical layer state of the first feature as the activated state.

The deactivation processing unit is configured to: if the notification is a first message that indicates that the physical layer state of the terminal after the configuration at the RRC layer corresponding to the first feature is updated is a deactivated state, after the terminal updates the configuration at the RRC layer corresponding to the first feature, configure the physical layer state of the first feature as the deactivated state.

In another embodiment of the present invention, the processing module 802 may include: a first processing unit, a second processing unit, a third processing unit, a fourth processing unit, or a fifth processing unit.

The first processing unit is configured to: if the notification indicates that the terminal has a specified state at the physical layer after the configuration at the RRC layer corresponding to the first feature is updated, ensure that the physical layer state of the first feature after the re-configuration is the same as the specified state; or, if the notification indicates that the terminal has no specified state at the physical layer after the configuration at the RRC layer corresponding to the first feature is updated, after the terminal updates the configuration at the RRC layer corresponding to the first feature, send a high speed shared control channel (HS-SCCH) order to synchronize with the physical layer state of the first feature of the terminal.

The second processing unit is configured to: if the receiving module receives a first message sent from the SRNC, ensure that the physical layer state of the first feature after the re-configuration is the same as the specified state; or, if the receiving module does not receive a first message sent from the SRNC, after the terminal updates the configuration at the RRC layer corresponding to the first feature, send an HS-SCCH order to synchronize with the physical layer state of the first feature of the terminal.

The third processing unit is configured to: if the receiving module does not receive a first message sent from the SRNC, ensure that the physical layer state of the first feature after the re-configuration is the same as the specified state; or, if the receiving module receives a first message sent from the SRNC, after the terminal updates the configuration at the RRC layer corresponding to the first feature, send an HS-SCCH order to synchronize with the physical layer state of the first feature of the terminal.

The fourth processing unit is configured to: if the receiving module receives a first message sent from the SRNC, and the first message indicates that the terminal has a specified state at the physical layer after the configuration at the RRC layer corresponding to the first feature is updated, ensure that the physical layer state of the first feature after the re-configuration is the same as the specified state; or, if the receiving module receives a first message sent from the SRNC, and the first message indicates that the terminal has no specified state at the physical layer after the configuration at the RRC layer corresponding to the first feature is updated, after the terminal updates the configuration at the RRC layer corresponding to the first feature, send an HS-SCCH order to synchronize with the physical layer state of the first feature of the terminal.

The fifth processing unit is configured to: if the notification instructs the base station to send an HS-SCCH order, send the HS-SCCH order to control the physical layer state of the first feature; or, if the notification instructs the base station not to send an HS-SCCH order, not control the physical layer state of the first feature.

By receiving a notification from an SRNC, the base station provided in this embodiment controls, according to the notification, a physical layer state of a first feature after re-configuration, so that after the terminal updates the configuration at the RRC layer corresponding to the first feature, the network side can synchronize with the physical layer state of the terminal, which solves the problem where the physical layer state of a feature at the terminal may be inconsistent with that at the network side, thereby avoiding loss during data transmission and preventing call drops of the terminal.

Here, during notification of the base station, notification may be performed by using the mode of sending a message, or may also be performed by using the mode of not sending a message, thereby achieving high flexibility.

Further, for a terminal that has a specified state at the physical layer after the configuration at the RRC layer corresponding to the first feature is updated, the NodeB does not need to send an HS-SCCH order to synchronize with the physical layer state of the feature of the terminal, which greatly saves overhead of the HS-SCCH signaling, thereby saving precious wireless network resources.

Figure 9:
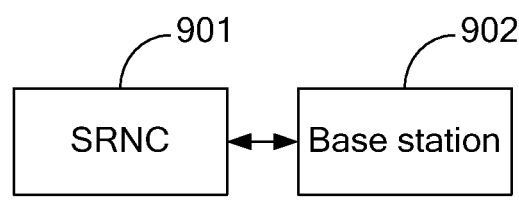
FIG. 9 is a structural diagram of a system for synchronizing a physical layer state according to another embodiment of the present invention.

Referring to FIG. 9, this embodiment provides a system for synchronizing a physical layer state. The system includes: an SRNC 901 and a base station 902, where the SRNC 901 may be the SRNC in any one implementation manner described in the third embodiment, and the base station 902 may be the base station any one implementation manner described in the fourth embodiment.

The system provided in this embodiment may execute the method provided in the above method embodiments. For the detailed process, see the method embodiments.

The system provided in this embodiment can realize synchronization between the physical layer states of the first feature at the terminal and the network side after the terminal updates the configuration at the RRC layer corresponding to the first feature, which solves the problem where the physical layer state of a feature at the terminal may be different from that at the network side, thereby avoiding loss during data transmission and preventing call drops of the terminal. In addition, for a terminal that has a specified state at the physical layer after the configuration at the RRC layer corresponding to the first feature is updated, the base station does not need to send an HS-SCCH order to synchronize with the physical layer state of the feature of the terminal, which greatly saves overhead of the HS-SCCH signaling, thereby saving precious wireless network resources.

Persons skilled in the art should clearly understand that, for ease and brevity of description, the specific working processes of the system, apparatus, and unit described previously may refer to the corresponding processes in the method embodiments, and are not described herein again.

In the embodiments provided in this application, it should be understood that the disclosed system, apparatus, and method may be implemented by using other means. For example, the embodiment for the apparatus described previously is only exemplary. For example, the division of the units is only a type of logical function division. In actual implementation, other division methods may be provided. For example, a plurality of units or components may be combined or integrated into another system, or some features may be ignored or skipped. In addition, the shown or discussed mutual coupling, direct coupling, or communication connection may be indirect coupling or communication connection through some interfaces, apparatuses, or units, and may be electrical, mechanical, or in other forms.

The units that are described as separate components may be physically separated or not physically separated, and the components shown as units may be physical units or not physical units, that is, may be located at one place or distributed on multiple network units. Some or all of the units may be selected according to actual needs to achieve the objective of the solution in the embodiment.

In addition, all functional units in each embodiment of the present invention may be integrated into a processing unit, or exist as independent physical units, or two or more units may be integrated into one unit. The integrated units may be implemented through hardware, or through software functional units.

If the integrated units are implemented through software functional units, and are sold or used as independent products, the integrated modules may be stored in a computer readable storage medium. Based on such understanding, the technical solutions of the present invention, the part that makes contributions to the prior art, or all or a part of the technical solutions may be essentially embodied in the form of a software product. This computer software product is stored in a storage medium, and includes several instructions that are configured for a computer device (which may be a personal computer, server, or network device) to execute all or a part of the steps of the method provided in each of the above embodiments of the present invention. The above storage medium includes any medium that is capable of storing program codes, including USB disk, mobile disk, read-only memory (ROM), random access memory (RAM), magnetic disk, optical disk and so on.

It should be noted that the above embodiments are merely provided for describing the technical solutions of the present invention, but not intended to limit the present invention. It should be understood by persons of ordinary skill in the art that although the present invention is described in detail with reference to the embodiments, modifications can be made to the technical solutions described in the embodiments, or equivalent replacements can be made to some technical features in the technical solutions, as long as such modifications or replacements do not depart from scope of the technical solutions according to the embodiments of the present invention.

What is claimed is:

1. A method for synchronizing a physical layer state, comprising:
   receiving relevant information about a first feature reported by a terminal;
   judging whether the terminal has a specified state at a physical layer after configuration at a radio resource control (RRC) layer corresponding to the first feature is updated according to the relevant information about the first feature;
   notifying a base station to control, according to whether the terminal has the specified state at the physical layer after the configuration at the RRC layer corresponding to the first feature is updated, the physical layer state of the first feature after re-configuration; or, notifying the base station of whether to control the physical layer state of the first feature according to whether the terminal has the specified state at the physical layer after the configuration at the RRC layer corresponding to the first feature is updated;
   judging a version of the terminal and judging whether the terminal has a capability of supporting the first feature according to access layer version information of the terminal in the relevant information about the first feature and further according to capability information about the first feature;
   determining that the terminal has no specified state at the physical layer after the configuration at the RRC layer corresponding to the first feature is updated when the version of the terminal is a first version and the terminal has the capability of supporting the first feature; and
   determining that the terminal has the specified state at the physical layer after the configuration at the RRC layer corresponding to the first feature is updated when the version of the terminal is a second version and the terminal has the capability of supporting the first feature;
   wherein the first version is one of universal mobile telecommunications system (UMTS) release 8 (R8) or a UMTS version earlier than UMTS R8, and wherein the second version is one of UMTS release 9 (R9) or a UMTS version later than UMTS R9.

2. The method according to claim 1, further comprising:
   notifying the base station to ensure that the physical layer state of the first feature after re-configuration is the same as the specified state when the terminal has the specified state at the physical layer after the configuration at the RRC layer corresponding to the first feature is updated; and
   notifying the base station to send, after the terminal updates the configuration at the RRC layer corresponding to the first feature, a high speed shared control channel (HS-SCCH) order to synchronize with the physical layer state of the first feature of the terminal when the terminal has no specified state at the physical layer after the configuration at the RRC layer corresponding to the first feature is updated.

3. The method according to claim 1, further comprising any one of the following steps:
   Step A: sending a first message to the base station to notify the base station to ensure that the physical layer state of the first feature after re-configuration is the same as the specified state when the terminal has the specified state at the physical layer after the configuration at the RRC layer corresponding to the first feature is updated;
   Step B: not sending the first message to the base station, and notifying the base station to send, after the terminal updates the configuration at the RRC layer corresponding to the first feature, a high speed shared control channel (HS-SCCH) order to synchronize with the physical layer state of the first feature of the terminal when the terminal has no specified state at the physical layer after the configuration at the RRC layer corresponding to the first feature is updated;
   Step C: not sending the first message to the base station, and notifying the base station to ensure that the physical layer state of the first feature after re-configuration is the same as the specified state when the terminal has the specified state at the physical layer after the configuration at the RRC layer corresponding to the first feature is updated;
   Step D: sending a second message to the base station to notify the base station to send, after the terminal updates the configuration at the RRC layer corresponding to the first feature, the high speed shared control channel (HS-SCCH) order to synchronize with the physical layer state of the first feature of the terminal when the terminal has no specified state at the physical layer after the configuration at the RRC layer corresponding to the first feature is updated;
   Step E: sending the first message to the base station to notify the base station to ensure that the physical layer state of the first feature after re-configuration is the same as the specified state when the terminal has the specified state at the physical layer after the configuration at the RRC layer corresponding to the first feature is updated; and
   Step F: sending the second message to the base station to notify the base station to send, after the terminal updates the configuration at the RRC layer corresponding to the first feature, the high speed shared control channel (HS-SCCH) order to synchronize with the physical layer state of the first feature of the terminal when the terminal has no specified state at the physical layer after the configuration at the RRC layer corresponding to the first feature is updated.

4. The method according to claim 3, wherein the sending the first or second message to the base station comprises one of the following steps:

Step 1: sending the first or second message, respectively, to the base station through an Iub interface; and Step 2: sending the first or second message, respectively, to a drift radio network controller (DRNC) through an Iur interface, so that the DRNC forwards the first or second message, respectively, to the base station.

5. The method according to claim 3, wherein the first and second messages comprise a signaling and frame protocol (FP) data frame.

6. The method according to claim 1, further comprising:
notifying the base station to send a high speed shared control channel (HS-SCCH) order to control the physical layer state of the first feature when the terminal has the specified state at the physical layer after the configuration at the RRC layer corresponding to the first feature is updated; and
notifying the base station not to send the high speed shared control channel (HS-SCCH) order to control the physical layer state of the first feature when the terminal has no specified state at the physical layer after the configuration at the RRC layer corresponding to the first feature is updated.

7. The method according to claim 1, wherein the first feature comprises any one of a discontinuous transmission (DTX) feature, a discontinuous reception (DRX) feature, a high speed shared control channel (HS-SCCH) less feature, and a dual-cell high speed uplink packet access (DC-HSUPA) feature.

8. A serving radio network controller (SRNC), comprising:
a receiver, configured to receive relevant information about a first feature reported by a terminal;
a processor coupled to the receiver and configured to judge whether the terminal has a specified state at a physical layer after configuration at a radio resource control (RRC) layer corresponding to the first feature is updated according to the relevant information about the first feature; and
a transmitter coupled to the processor and configured to notify a base station to control a physical layer state of the first feature after re-configuration according to whether the terminal has the specified state at the physical layer after the configuration at the RRC layer corresponding to the first feature is updated; or, notify the base station of whether to control the physical layer state of the first feature according to whether the terminal has the specified state at the physical layer after the configuration at the RRC layer corresponding to the first feature is updated;
wherein the processor is further configured to judge a version of the terminal and judge whether the terminal has a capability of supporting the first feature according to access layer version information of the terminal in the relevant information about the first feature and further according to capability information about the first feature; and
wherein the processor is further configured to perform at least one of determine that the terminal has no specified state at the physical layer after the configuration at the RRC layer corresponding to the first feature is updated when the version of the terminal is a first version and the terminal has the capability of supporting the first feature, or, determine that the terminal has the specified state at the physical layer after the configuration at the RRC layer corresponding to the first feature is updated when the version of the terminal is a second version and the terminal has the capability of supporting the first feature;

wherein the first version is one of universal mobile telecommunications system (UMTS) release 8 (R8) or a UTMS version earlier than UMTS R8, and wherein the second version is one of UMTS release 9 (R9) or a UTMS version later than UMTS R9.

9. The SRNC according to claim 8, wherein,
the transmitter is further configured to notify the base station to ensure that the physical layer state of the first feature after re-configuration is the same as the specified state when the terminal has the specified state at the physical layer after the configuration at the RRC layer corresponding to the first feature is updated; or, notify the base station to send, after the terminal updates the configuration at the RRC layer corresponding to the first feature, a high speed shared control channel (HS-SCCH) order to synchronize with the physical layer state of the first feature of the terminal when the terminal has no specified state at the physical layer after the configuration at the RRC layer corresponding to the first feature is updated.

10. The SRNC according to claim 8, wherein,
the transmitter is further configured to: send a first message to the base station to notify the base station to ensure that the physical layer state of the first feature after re-configuration is the same as the specified state when the terminal has the specified state at the physical layer after the configuration at the RRC layer corresponding to the first feature is updated; or, not send the first message to the base station, and notify the base station to send, after the terminal updates the configuration at the RRC layer corresponding to the first feature, a high speed shared control channel (HS-SCCH) order to synchronize with the physical layer state of the first feature of the terminal when the terminal has no specified state at the physical layer after the configuration at the RRC layer corresponding to the first feature is updated.

11. The SRNC according to claim 8, wherein,
the transmitter is further configured to: not send a first message to the base station, and notify the base station to ensure that the physical layer state of the first feature after re-configuration is the same as the specified state when the terminal has the specified state at the physical layer after the configuration at the RRC layer corresponding to the first feature is updated; or, send the first message to the base station to notify the base station to send, after the terminal updates the configuration at the RRC layer corresponding to the first feature, a high speed shared control channel (HS-SCCH) order to synchronize with the physical layer state of the first feature of the terminal when the terminal has no specified state at the physical layer after the configuration at the RRC layer corresponding to the first feature is updated.

12. The SRNC according to claim 8, wherein,
the transmitter is further configured to: send a first message to the base station to notify the base station to ensure that the physical layer state of the first feature after re-configuration is the same as the specified state when the terminal has the specified state at the physical layer after the configuration at the RRC layer corresponding to the first feature is updated; or, send a second message to the base station to notify the base station to send, after the terminal updates the configuration at the RRC layer corresponding to the first feature, a high speed shared control channel (HS-SCCH) order to synchronize with the physical layer state of the first feature of the terminal when the terminal has no specified state at the physical layer after the configuration at the RRC layer corresponding to the first feature is updated.

13. The SRNC according to claim 8, wherein,
the transmitter is further configured to: notify the base station to send a high speed shared control channel (HS-SCCH) order to control the physical layer state of the first feature when the terminal has the specified state at the physical layer after the configuration at the RRC layer corresponding to the first feature is updated; or, notify the base station not to send the high speed shared control channel (HS-SCCH) order to control the physical layer state of the first feature when the terminal has no specified state at the physical layer after the configuration at the RRC layer corresponding to the first feature is updated.

14. The method according to claim 1, wherein the first feature is a dual-cell high speed downlink packet access (DC-HSDPA) feature.

15. The SRNC according to claim 8, wherein the first feature is a dual-cell high speed downlink packet access (DC-HSDPA) feature.

* * * * *